United States Patent
Kellström et al.

[11] Patent Number: 6,000,854
[45] Date of Patent: Dec. 14, 1999

[54] SEALED BEARING

[75] Inventors: Magnus Kellström, Partille; Jan Dagnell, Angered, both of Sweden

[73] Assignee: Aktiebolaget SKF, Goteborg, Sweden

[21] Appl. No.: 09/066,418

[22] PCT Filed: Jan. 30, 1996

[86] PCT No.: PCT/SE96/00090

§ 371 Date: Sep. 3, 1998

§ 102(e) Date: Sep. 3, 1998

[87] PCT Pub. No.: WO97/17549

PCT Pub. Date: May 15, 1997

[30] Foreign Application Priority Data

Nov. 9, 1995 [SE] Sweden .................................. 9503976

[51] Int. Cl.[6] .............................. F16C 33/72; F16C 23/08
[52] U.S. Cl. ........................................... 384/484; 384/558
[58] Field of Search ...................................... 384/558, 568, 384/477, 481, 482, 484, 485, 486, 560, 551, 505, 572, 470

[56] References Cited

U.S. PATENT DOCUMENTS

| | | | |
|---|---|---|---|
| 2,767,037 | 10/1956 | Williams | 384/558 X |
| 3,366,428 | 1/1968 | Smith | 384/482 |
| 4,978,235 | 12/1990 | Jacob | 384/450 |
| 5,119,446 | 6/1992 | Grafstrom et al. | 384/477 X |
| 5,435,653 | 7/1995 | Kellström | 384/484 |

FOREIGN PATENT DOCUMENTS

| | | |
|---|---|---|
| 2007981 | 1/1970 | France . |
| 2 004 570 | 8/1970 | Germany . |
| 2 251 466 | 5/1973 | Germany . |

*Primary Examiner*—Thomas R. Hannon
*Attorney, Agent, or Firm*—Burns, Doane, Swecker & Mathis, L.L.P.

[57] ABSTRACT

Sealed bearing incorporating an inner race (13) an outer race ring (14) and a row of elongated rollers (15) disposed between, whereby races (11, 12) and rollers (15) have curved longitudinal section profiles and which rollers (15) are axially moveable between the races relative thereto for allowing mutual misalignment of the races, and whereby at least one sealing member (18) is formed separately, positioned axially outside the rollers (15) but adapted to follow the rollers (15) in a free-floating manner and arranged to provide its sealing effect by frictional engagement, wherein at least one of the inner and outer race rings (13, 14) at the axial outer ends of its race (11, 12) is each provided with a radially projecting motion preventing means (20) of short axial width, arranged to prevent the sealing member (18) from being pressed out from the space between the bearing race rings even at misalignments of the race rings (13, 14) relative to each other.

19 Claims, 2 Drawing Sheets

SEALED BEARING

The present invention refers to a sealed bearing of the type described in the preamble of the accompanying claim 1.

The bearing itself is designed such as shown and described in U.S. Pat. No. 4,705,411, and therefore this publication is incorporated in the present specification.

U.S. Pat. No. 5,435,653 discloses a sealed self-aligning roller bearing, of the type having an outer race ring, an inner race ring and a plurality of curved rollers disposed therebetween and being axially moveable relative to the race rings. The space between the inner race ring and the outer race ring at least at one side axially outside the rollers is sealed off by a sealing member arranged in an almost "floating manner", on one hand to provide a sealing effect by frictional engagement against both race rings and on the other hand to follow the axial adjustment movements of the rollers. One of the main features of bearings of this kind is that the adjustability and motion of the rollers may not be hampered by annular flanges or the like, the race rings thereby being freely adjustable relative to each other during axial and angular adjustment of the rollers to provide a proper bearing function.

A further important feature of such a bearing is that the very large misalignment, which can be achieved, makes it possible to insert even a full complement of rollers between the race rings without need of split bearing rings, detachable flanges or the like.

A problem appearing at such a sealed bearing is that, at sufficient misalignment of the bearing rings, and thereby the rollers, the sealing ring or rings may be pushed out from the space between the bearing race rings and then come loose.

This might happen as a result of such large misalignment, due to the fact that the rollers will move so far axially to compensate for the misalignment, that the end faces of the rollers may press against the surface of the sealing ring, thereby urging this to slide outside the bearing rings.

This drawback is most critical during the time the bearing is handled before being mounted in operative position, as the force for causing misalignments and displacements big enough to risk that the sealing member is pushed out off the bearing is not bigger than what can be caused by manual influence only.

An alternative would be to provide a fixed locking ring at the end face of the race ring, but such a locking ring could mean that the sealing member or even the bearing itself is damaged if the bearing rings and the rollers during operation should be extremely misaligned and displaced, as the sealing member then would be squeezed between the roller ends and the locking ring.

The purpose of the present invention is to provide a solution of this problem, thereby ascertaining that the free-floating sealing ring or sealing rings of such a bearing, will not be pushed out of its position between the race rings of the bearing during misalignments and displacements normally occuring during handling, whereas at extreme operative displacement of the rollers, it can be pushed out rather than being damaged, and this has been achieved by giving the bearing the features defined in the accompanying claims.

Hereinafter the invention will be described in detail with reference to two embodiments shown in the accompanying drawings. The embodiments shown are intended only to exemplify the invention and are not to be seen as the only possible embodiments within the scope of the appended claims.

In drawing FIG. 1 shows an axial section through a bearing in accordance with a first embodiment of the invention. FIG. 2 illustrates in larger scale a portion of the outer race ring of the bearing shown in FIG. 1 with a sealing ring displaced axially as far as permitted.

Figure 1:
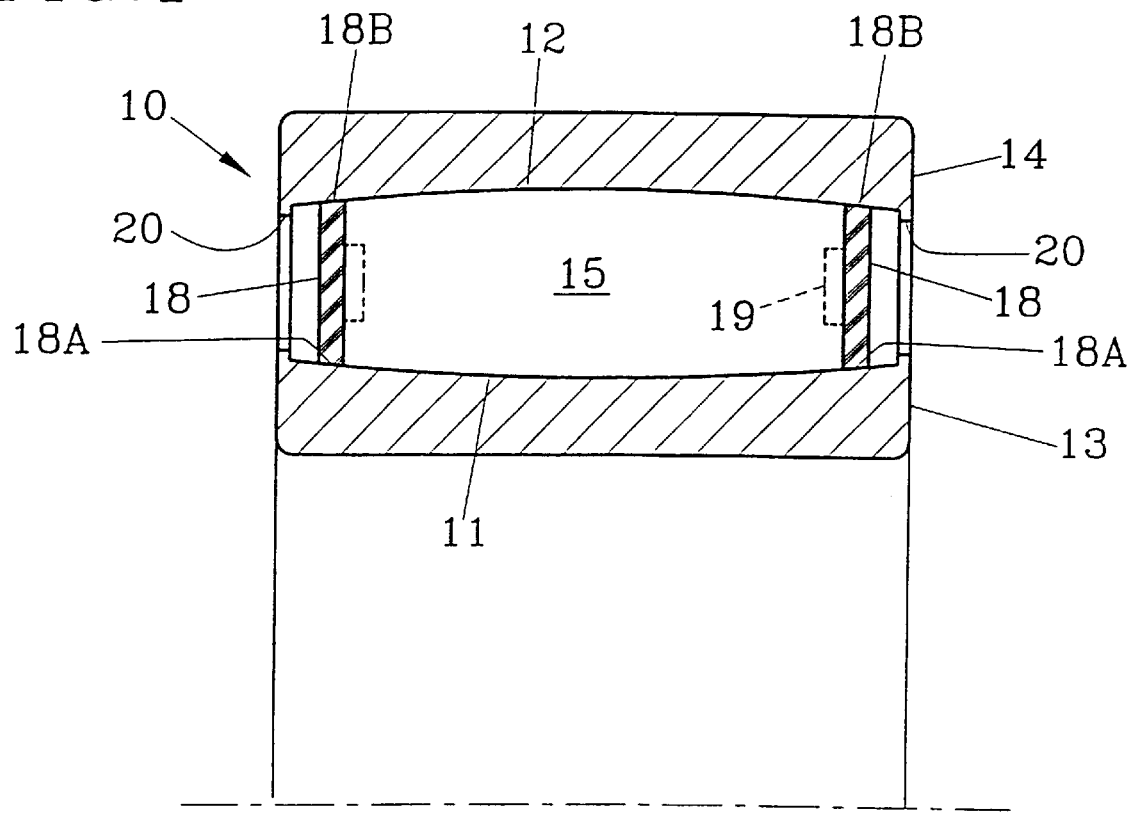

In the bearing designated 10 in FIG. 1, each one of the races 11, 12 on the inner race ring 13 and on the outer race ring 14 resp. are shaped with concave profile. The elongated rollers 15 provided between the races 11, 12 are axially displaceable between the races without obstruction from annular flanges at the races in order to allow mutual misalignment between the inner race ring 13 and the outer race ring 14. The bearing is preferably designed as a bearing having a full complement of rollers, i.e. without a cage for the rollers.

The bearing is further provided with free-floating sealing members 18 arranged to provide a sealing effect by friction engagement against the inner race 11 as well as against the outer race 12, i.e. at 18A and 18B, resp. This means that the sealing element 18, will be carried along by the end surface of the roller, without being affixed thereto, and it therefore will follow the roller 15 in the axial movement thereof, caused by misalignment of the bearing race rings.

At misalignment of the inner race ring 13 in relation to the outer race ring 14 the distance between the races 11, 12 is maintained practically constant, i.e. the height of the sealing member 18 is maintained constant, which means that the sealing force of the sealing member 18 is kept unaltered. At the above-mentioned misalignment the radially opposed rollers will be displaced relative to each other, which results in a necessity to extend the sealing member 18 somewhat. This is made possible in that the sealing member is formed entirely flexible, e.g. by being made from rubber, and by being squeezed between the race rings thereby getting a slight pretension.

At a bearing according to the present invention the sealing member 18 will follow the rollers 15 in their axial movement. This is effected in that the normal force between the sealing member 18 and each one of the races 11, 12 has a componant urging the sealing member against the end surface of the rollers 15. If the friction between the sealing member 18 and the races 11, 12 is low, which is the case if the sealing member rotates relative to those, the sealing member will always be pressed against the roller end.

The sealing member 18 is mounted between the races 11, 12 under squeezing, whereby it, independent of mutual movement between the inner and outer race rings of the bearing, will have an inherent force produced during the mounting, which urges the seal against the ends of the set of rollers.

As mentioned above the sealing member 18 will yield somewhat at misalignment of the inner race ring relative to the outer race ring, i.e. when the rollers are displaced axially relative to each other. The expansion of the sealing member 18 caused thereof means that this obtains an inherent force which tends to regain the initial shape of the sealing member and thereby tries to move back the sealing member against the end of the roller if the sealing member should have moved away from this.

Particularly during handling of the bearing, prior to its mounting in its operating position, the race rings and thereby the rollers could accidentally be mislocated so much that the rollers could move axially almost to the side planes of the race rings. In such case the misalignment could cause the set of rollers to press out the sealing ring 18 of its position between the race rings, thereby causing the seal either to be lost or mispositioned in such a manner that it can not provide a proper sealing function any longer.

For preventing this the outer race ring adjacent its end faces is provided with motion preventing means 20 arranged to prevent the sealing ring 18 from moving axially outside the side face of the bearing race rings. As the axial motion of the rollers is equal to or bigger at the outer race ring as compared to the motion thereof adjacent the inner race ring it is sufficient to provide such motion preventing means 20 at the outer race ring.

For ascertaining that the rubber sealing ring is prevented from sliding out axially from the bearing during handling thereof, the motion preventing means 20, according to the embodiment shown in FIG. 1, could be a very low ridge of small width.

If the ridge 20 is too high it will prevent assembly of the bearing. It therefore must not be bigger than the bearing clearance plus the clearance increase corresponding to the position of the roller adjacent the ridge.

For facilitating the assembly of the bearing and/or for allowing a somewhat increased radial height of the ridge it is possible to provide one or both ridges with filling slots (not shown), whereby the introduction of the rollers is facilitated in spite of the higher ridge 20.

Figure 3:
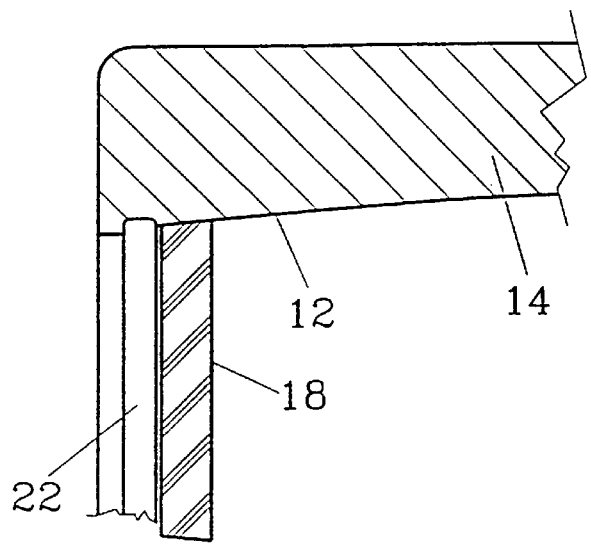
FIG. 3 shows in a view similar to FIG. 2 a second embodiment of the invention and with the sealing ring in a free-floating position.

FIG. 3 shows a portion of an outer bearing race ring 14, wherein its race 12 cooperates with a sealing ring 18, arranged in a free-floating manner in accordance with the earlier embodiment, thus that the sealing ring will follow the axial movements of the (not shown) rollers. For preventing the sealing ring from being pushed out of the bearing, there is at the outermost axial end of the bearing race 12 provided a motion preventing means, which in this embodiment is a shallow, circumferential groove 22 of short axial width.

Figure 4:
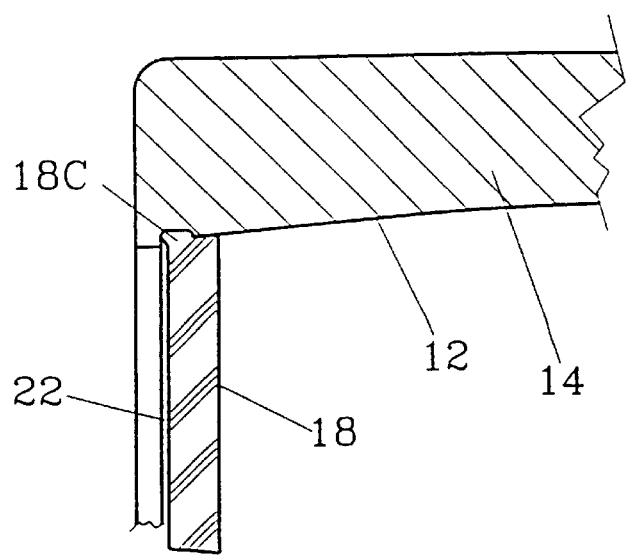
FIG. 4 is a view corresponding to FIG. 3 with the sealing ring shown in a trapped position.

FIG. 4 shows a position in which the sealing ring 18 has been pushed axially so far out, that it has reached the shallow groove 22. In this position, due to its inherent pretension caused by the squeezing type of mounting and thanks to its flexibility, a portion 18C of the sealing ring, which was earlier engaging the race 12, has now entered into the shallow groove 22, thereby causing an increased resistance against further axial displacement of the sealing ring 18, and thus preventing it from being pushed out of the bearing, when subjected to normal handling forces. This motion preventing means in form of a shallow groove, in the same manner as the low ridge shown in FIG. 1, however will not prevent the sealing ring 18 from being pushed further, when subjected to bigger, operational forces, thereby not risking damage to bearing or to sealing ring.

Figure 5:
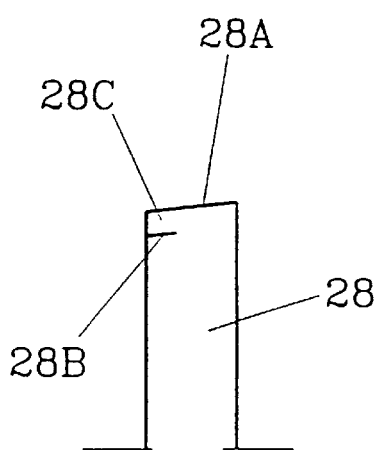
FIG. 5 shows schematically and in bigger scale a portion of one embodiment of the sealing ring in a free position.

In FIG. 5 is schematically shown a portion of a somewhat modified separate sealing ring 28, having its outer edge 28A cut obliquely, and having from one side a short, inclined in-cut 28B, extending only through a portion of the axial extension of the sealing ring 28. The portion 28C radially outside said incut 28B thereby will be flexible as an elastic flap.

Figure 6:
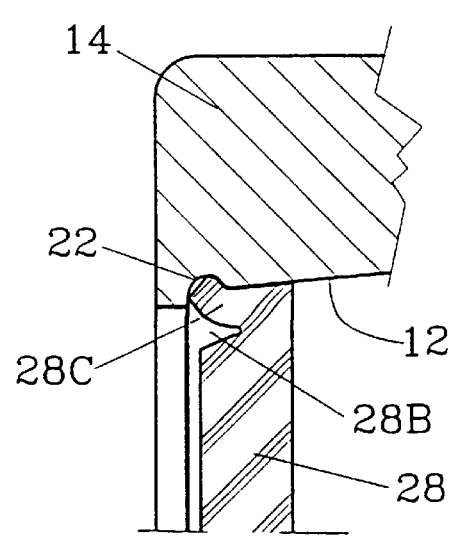
FIG. 6 shows the sealing ring according to FIG. 5 in trapped position at a bearing ring, only a portion of which is shown.

In FIG. 6 finally is shown how the flexible flap 28C, due to its squeezed in mounting in the outer race ring 14, will flex out and enter into the circumferential shallow groove 22 provided in the race 12 of the ring, thereby creating a resistance against further axial displacement of the sealing ring 28.

Figure 2:
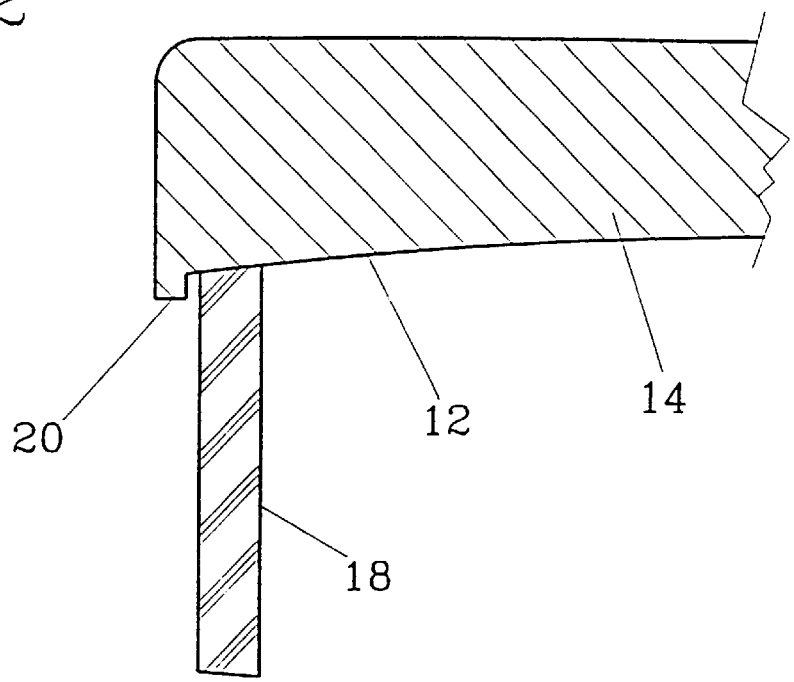

The invention is not limited to the embodiments described and shown in the accompanying drawings, but modifications and amendments are possible within the scope of the appended claims. Although FIGS. 1 and 2 of the drawings show the motion preventing means as a ridge 20, which is a continuous shoulder formed and integral with the very race ring, it thus is possible to make the motion preventing means as a separate member, e.g. a stiff wire inserted in a circumferential groove at the axial end of the bearing race, with a portion of the wire projecting out of said groove. Furthermore it is possible to make either the integral ridge or the separate member intermittent, thus that it projects radially only at some positions around the circumference of the bearing.

We claim:

1. Sealed bearing comprising an inner race ring with an inner race, an outer race ring with an outer race, a row of elongated rollers disposed between and engaging said inner and outer races, said inner and outer races and said rollers having curved longitudinal section profiles and said rollers, without obstruction from annular flanges at the inner and outer races, being axially moveable between the inner and outer races relative thereto for allowing mutual misalignment of the inner and outer races, and at least one sealing member for sealing off a space between the inner race ring and the outer race ring, said at least one sealing member being formed separately, positioned axially outside said rollers and adapted to follow the rollers during their axial movement in a free-floating manner and arranged to provide a sealing effect by frictional engagement against the inner race as well as against the outer race, at least one of the inner and outer race rings adjacent axial outer ends of its respective race is provided with motion preventing means of short axial width, arranged to catch and retain the sealing member from being pushed out axially from the bearing, during axial movement of the at least one sealing member in a direction out from the space between the inner and outer race rings during misalignments of the inner and outer race rings relative to each other.

2. A sealed bearing as claimed in claim 1, wherein the motion preventing means is formed as a circumferentially arranged ridge of low radial height, formed integral with the race ring at each outermost axial end of at least one of the bearing races.

3. A sealed bearing as claimed in claim 2, wherein the motion preventing ridge is provided with at least one filling slot for facilitating introduction of rollers between the inner and outer race rings, in spite of the reduction of the opening between the race rings caused by said ridge.

4. A sealed bearing as claimed in claim 1, wherein the motion preventing means is formed as a radially projecting ridge, which projects continuously over the entire circumference of said at least one race ring.

5. A sealed bearing as claimed in claim 1, wherein the motion preventing means is formed as a radially projecting intermittent ridge.

6. A sealed bearing as claimed in claim 1, wherein the motion preventing means is formed as at least one separate member, fitted to the said at least one race ring at each outermost axial end of at least one of the inner and outer races.

7. A sealed bearing as claimed in claim 1, wherein the motion preventing means is formed as a shallow circumferential groove formed in the at least one race ring at an outermost axial end of the respective race.

8. A sealed bearing as claimed in claim 7, wherein the shallow circumferential groove is arranged to cooperate with the sealing member in the form of a sealing ring, having a portion provided at its edge contacting the race ring with said groove, arranged to enter into said groove, when the sealing ring is moved in front of said groove.

9. A sealed bearing as claimed in claim 8, wherein the portion of the sealing ring arranged to cooperate with the shallow circumferential groove, is designed as an elastic flap arranged to be subjected to a pretension caused by axial movement of the sealing ring, resulting in the flap being pressed into said groove, when the sealing ring is situated in front thereof.

10. A sealed bearing as claimed in claim 9, wherein the sealing ring is provided with an inclined, short in-cut adjacent an edge of the sealing ring contacting the race ring having the groove, the said in-cut forming the said elastic flap in the material of the sealing ring.

11. A sealed bearing as claimed in claim 1, wherein the said motion preventing means is provided in the outer race of the outer race ring only.

12. Sealed bearing comprising an inner race ring provided with an inner race, an outer race ring provided with an outer race, a space formed between the inner and outer race rings, a row of elongated rollers disposed between and engaging said inner and outer races, said inner and outer races and said rollers have curved longitudinal section profiles, at least one sealing member formed separately from the inner and outer race rings and positioned between the inner and outer race rings for sealing off the space between the inner race ring and the outer race ring through frictional engagement against the inner race as well as against the outer race, and means provided adjacent an axial outer end of at least one of the inner and outer race rings for preventing axially outward movement of the sealing member to prevent the sealing member from being pushed axially out of the bearing.

13. A sealed bearing as claimed in claim 12, wherein said means is formed as a continuous ridge that projects radially inwardly over the entire circumference of said at least one of the inner and outer race rings.

14. A sealed bearing as claimed in claim 12, wherein said means is formed as a radially projecting intermittent ridge.

15. A sealed bearing as claimed in claim 14, wherein said ridge is provided with at least one filling slot for facilitating introduction of rollers between the inner and outer race rings.

16. A sealed bearing as claimed in claim 12, wherein said means is formed as at least one separate member that is fitted to said at least one of the inner and outer race ring.

17. A sealed bearing as claimed in claim 12, wherein said means is formed as a circumferential groove formed in said at least one of the inner and outer race ring at an outermost axial end of said at least one of the inner and outer race ring.

18. A sealed bearing as claimed in claim 17, wherein the sealing member is in the form of a ring and said circumferential groove is adapted to receive the ring when the ring is moved axially in front of said groove.

19. A sealed bearing as claimed in claim 18, wherein a portion of the ring is cut obliquely to form an elastic flap.

\* \* \* \* \*